US005825756A

United States Patent [19]

Hattori

[11] Patent Number: 5,825,756

[45] Date of Patent: Oct. 20, 1998

[54] RECEIVER FOR FM DATA MULTIPLEX BROADCASTING

[75] Inventor: Shinji Hattori, Higashiosaka, Japan

[73] Assignee: Sharp Kabushiki Kaisha, Osaka, Japan

[21] Appl. No.: 677,476

[22] Filed: Jul. 10, 1996

[30] Foreign Application Priority Data

Sep. 6, 1995 [JP] Japan .................................... 7-229469

[51] Int. Cl.[6] ..................................................... H04B 7/204

[52] U.S. Cl. .......................... 370/319; 370/343; 375/340; 455/45

[58] Field of Search .................................... 370/343, 344, 370/431, 480, 481, 482, 484, 487, 488, 319; 375/316, 340, 344, 346, 350, 260; 455/45, 142, 143; 341/155

[56] References Cited

U.S. PATENT DOCUMENTS

| | | | |
|---|---|---|---|
| 4,654,884 | 3/1987 | Sakai et al. | 455/183 |
| 4,881,272 | 11/1989 | Eguchi | 455/143 |
| 5,068,918 | 11/1991 | Verheigen et al. | 455/142 |
| 5,081,604 | 1/1992 | Tanaka | 364/724.6 |
| 5,193,213 | 3/1993 | Chon | 455/45 |
| 5,289,464 | 2/1994 | Wang | 375/260 |

*Primary Examiner*—Hassan Kizou
*Assistant Examiner*—A. Bnimoussa

[57] ABSTRACT

A receiver for FM data multiplex broadcasting includes a analog/digital converter for receiving an analog FM demodulation signal and for converting the analog FM demodulation signal into a digital FM demodulation signal; a digital filter for processing the digital FM demodulation signal so as to isolate a digital multiplex signal; and a demodulator for demodulating said digital multiplex signal.

22 Claims, 13 Drawing Sheets

RECEIVER FOR FM DATA MULTIPLEX BROADCASTING

BACKGROUND OF THE INVENTION

1. Field of the Invention

The present invention relates to a receiver for FM data multiplex broadcasting. More particularly, it relates to an apparatus provided with digital filters for receiving FM waves transmitted in a multiplex mode.

2. Description of the Background Art

A receiver for FM data multiplex broadcasting is an apparatus which receives multiplex signal waves transmitted with ordinary FM broadcast waves. The frequency spectrum of the FM broadcast waves and the frequency spectrum of the multiplex signal waves are multiplexed and transmitted in such a manner that they do not overlap on a frequency axis. Examples of an application of such a receiver for FM data multiplex broadcasting include an FM teletext receiver, an FM pager, a traffic information system, etc.

A conventional receiver for FM data multiplex broadcasting will be described with reference to FIGS. 16 and 17. The conventional receiver for FM data multiplex broadcasting uses analog filters such as a switched capacitor filter in order to isolate a multiplex signal wave 151 from an FM demodulation wave including both the multiplex signal wave 151 and a broadcast wave 150 coexisting together. Examples of products which make use of this technology include LV3400M manufactured by Sanyo Electric Co., Ltd.

The conventional receiver for FM data multiplex broadcasting includes an anti aliasing filter circuit 141 which outputs a signal 142 obtained from an FM demodulation wave 140 by removing therefrom high-frequency-band noise components, a switched capacitor filtering circuit 143 which isolates and outputs a multiplex signal wave 144 from the signal 142, and a demodulation circuit 145 which demodulates bit data 146 from the multiplex signal wave 144 and produces a bit clock 147.

The antialiasing filter circuit 141 is placed upstream of the switched capacitor filter circuit 143 in order to remove signal components with clock frequencies one half or greater than the clock frequency of the switched capacitor filter circuit 143. This is because the switched capacitor filter circuit 143 is only capable of processing frequency components with frequencies up to one half its clock frequency.

The switched capacitor filter circuit 143 receives the filtered signal 142 and outputs the multiplex signal wave 144 to the demodulation circuit 145. The frequency characteristic 152 of the switched capacitor filter circuit 143 is a band-pass characteristic centered at the center frequency 153 of the multiplex signal wave 151.

The demodulation circuit 145 receives the multiplex signal wave 144 and outputs the bit data 146 and the bit clock 147. In order to demodulate the bit data 146, delay detection or synchronous detection is employed. In order to produce the bit clock 147, PLL technology or the like is typically employed.

However, the following problems exist in the above-mentioned conventional receiver for FM data multiplex broadcasting. That is, since the analog filters used in the conventional receiver for FM data multiplex broadcasting output a noise from a power source circuit or a noise produced by an amplifier, the signal-to-noise ratio decreases.

Furthermore, in order to enhance the ability to remove frequency components other than the multiplex signal, it is necessary to increase the number of stages of the analog filters to be connected in series. However, as the number of stages of the filters increases, problems arise such as an increase in noise level, deviation of characteristics of the filters, deterioration of phase characteristic, etc.

SUMMARY OF THE INVENTION

According to one aspect of the present invention, a receiver for FM data multiplex broadcasting includes a analog/digital converter for receiving an analog FM demodulation signal and for converting the analog FM demodulation signal into a digital FM demodulation signal; a digital filter for processing the digital FM demodulation signal so as to isolate a digital multiplex signal; and a demodulator for demodulating the digital multiplex signal.

In one embodiment of the present invention, the analog/digital converter includes a noise shaping type one-bit analog/digital converter for receiving the analog FM demodulation signal and for converting the analog FM demodulation signal into digital signals based on the sampling frequency, and a resampling filter for selecting the digital FM demodulation signal from the digital signals based on one nth of the sampling frequency.

In one embodiment of the present invention, the one-bit analog/digital converter performs second-order sigma-delta modulation.

In one embodiment of the present invention, n is 16.

In one embodiment of the present invention, the digital filter includes a finite impulse response filter.

In one embodiment of the present invention, the finite impulse response filter includes a plurality of delay elements, a plurality of multipliers and an adder.

In one embodiment of the present invention, the number of the plurality of delay elements is $4k-1$ where k is a natural number; and the multipliers whose filter coefficient becomes 0 are the multipliers receiving the signals which are not delayed and the multipliers receiving the signals which have passed 2r number of delay elements where r is a natural number.

In one embodiment of the present invention, the number of the plurality of delay elements is $4k+1$ where k is a natural number; and the multipliers whose filter coefficient becomes 0 are the multipliers receiving the signals which have passed $2r-1$ number of delay elements where r is a natural number.

In one embodiment of the present invention, filter coefficient values of the finite impulse response filter are symmetrical.

In one embodiment of the present invention, the finite impulse response filter performs signal processing at a sampling frequency which is quadruple the multiplex signal center frequency.

In one embodiment of the present invention, n is an integer.

In one embodiment of the present invention, filter coefficients of the multipliers at the positions adjacent to the center multiplier and then at every other position from the adjacent positions of the finite impulse response filter are 0.

Thus, the invention described herein makes possible at least the following advantages.

(1) The receiver for FM data multiplex broadcasting according to the present invention has no noise which would enter from a power source circuit or be produced by an amplifier in a conventional analog filter, thereby improving the signal-to-noise ratio.

(2) Although highly accurate frequency characteristics cannot be obtained for the conventional analog filter because of the deviation in accuracy or the like of the constituent components, a frequency characteristic which conforms to the theory can be obtained for the receiver for FM data multiplex broadcasting according to the present invention so that signal components other than the multiplex signal wave can be considerably suppressed.

(3) Since the digital filter is configured of logic circuits which do not use any amplifiers, a low power consumption design can easily be made in contrast to a receiver for FM data multiplex broadcasting employing conventional analog filters which use a number of amplifiers.

(4) Even if the number of stages of digital filters to be connected in series is increased, there is no increase in noise level, no deviation of characteristics and no deterioration of phase characteristics. The reason for this is as follows. The receiver for FM data multiplex broadcasting according to the present invention comprises a noise shaping type one-bit AD converter circuit as an AD converter circuit and a resampling filter. The resampling filter receives n number of signals. The resampling filter selects every qth signal from the n number of signals where q is an integer equal to or greater than 2. The resampling filter outputs m number of selected signals. Seemingly, the receiver for FM data multiplex broadcasting of the present invention does not sample the analog FM demodulation signal at the sampling frequency of the analog/digital converter but samples at one fth of the sampling frequency.

According to the present invention, miniaturization and low power consumption are possible compared to a case where an AD converter circuit using an eight-bit flash method using 256 comparators (configuration including split resistors and comparators) is used.

(5) Since the one-bit AD converter circuit can easily be configured with, for example, two operational amplifiers and one comparator, it can easily be integrated on the same silicon chip as digital circuits such as a digital filter. Moreover, a finite impulse response filter whose filter coefficient value is zero at an mth position, m being an odd number, and which performs signal processing at a sampling frequency which is a quadruple of the multiplex signal center frequency, is used as a digital filter. As a result, at least the following effects are obtained.

(a) Since a linear phase characteristic which cannot be realized with the conventional analog filter can be obtained by the digital filter of the present invention, a phase distortion can be eliminated.

(b) Since a method which can reduce the amount of operations for filter coefficients is used, a logic circuit can easily be designed, and miniaturization and low power consumption become possible. Furthermore, since the operation speed can be increased, it can be used for signals in a high frequency region.

These and other advantages of the present invention will become apparent to those skilled in the art upon reading and understanding the following detailed description with reference to the accompanying figures.

DESCRIPTION OF THE PREFERRED EMBODIMENTS

Figure 1:
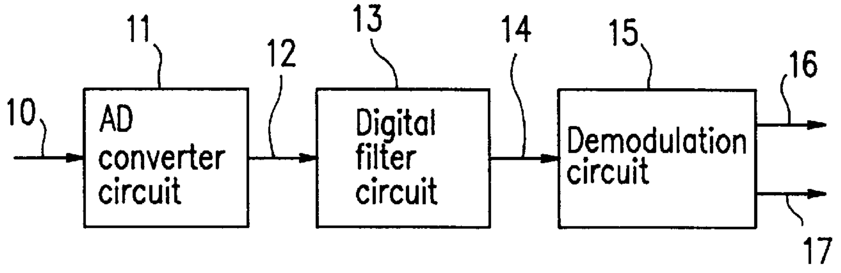
FIG. 1 is a block diagram illustrating an embodiment of a receiver for FM data multiplex broadcasting according to the present invention.

FIG. 1 is a block diagram illustrating an embodiment of a receiver for FM data multiplex broadcasting according to the present invention. An analog/digital converter circuit (AD converter circuit) 11 converts input FM demodulation wave 10 into digital signals, and outputs the converted digital FM demodulation wave 12 to a digital filter circuit 13. The digital filter circuit 13 isolates a digital multiplex signal wave 14 from the input digital FM demodulation wave 12 by performing digital signal processing, and outputs the isolated signal wave to a demodulation circuit 15. The demodulation circuit 15 demodulates the input digital multiplex signal wave 14 and outputs bit data 16 and a bit clock 17.

Figure 2:
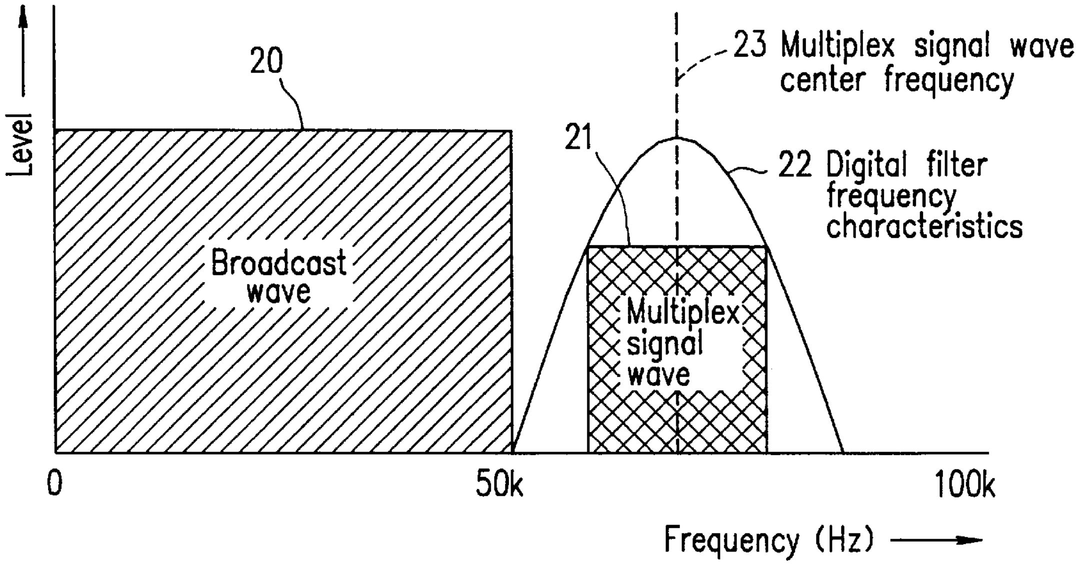
FIG. 2 is a diagram illustrating a frequency spectrum of the digital FM demodulation wave 12 of FIG. 1.

FIG. 2 illustrates the frequency spectrum of the digital FM demodulation wave 12. As illustrated in FIG. 2, the digital FM demodulation wave 12 is a signal including a multiplex signal wave 21 and a broadcast wave 20 multiplexed at different frequencies. The broadcast wave 20 is an ordinary FM broadcast wave whose upper limit frequency in its spectrum is about 50 kHz. The multiplex signal wave 21 having the multiplex signal wave center frequency 23 transmits digital data representing, for example, characters. The digital filter circuit 13 has a band-pass characteristic 22 illustrated in FIG. 2 in order to isolate the multiplex signal wave 14 from the digital FM demodulation wave 12. The demodulation circuit 15 demodulates the multiplex signal wave 14 and outputs the bit data 16 and the bit clock 17.

Figure 3:
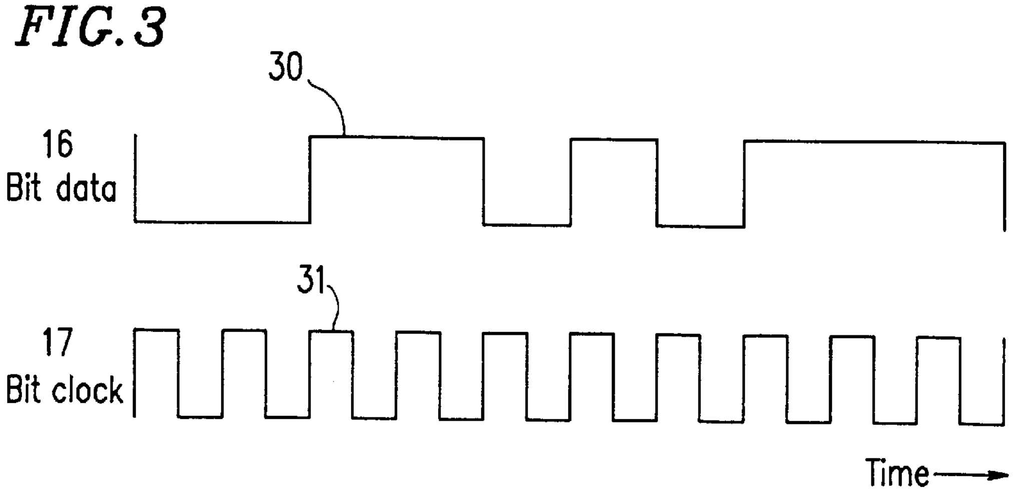
FIG. 3 is a timing chart showing the bit data 16 and the bit clock 17 of FIG. 1.

FIG. 3 illustrates a timing chart showing the bit data 16 and the bit clock 17. A time 30 for the bit data 16 to make a transition is synchronous with a rise 31 of the bit clock 17. The bit data 16 and the bit clock 17 are used, for example, to reproduce the content of transmitted teletext.

Example 1

Figure 4:
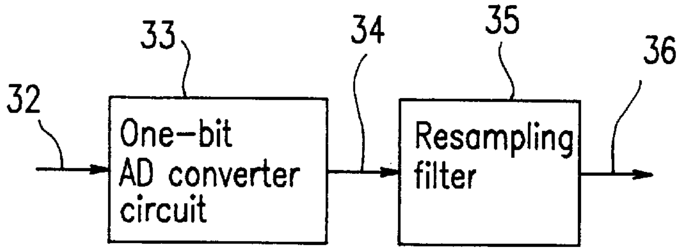
FIG. 4 is a block diagram of an AD converter circuit of the receiver for FM data multiplex broadcasting according to the present invention and described in Example 1.

FIG. 4 illustrates a block diagram of an AD converter circuit of the receiver for FM data multiplex broadcasting according to one embodiment of the present invention.

In Example 1, the AD converter circuit 11 includes a noise shaping type one-bit AD (analog/digital) converter circuit 33 and a resampling filter 35. Upon receiving n number of signals, the resampling filter 35 selects every qth signal (for example, every second signal, every third signal, every fourth signal, etc.) from the n number of signals where q is an integer equal to or greater than 2. The resampling filter 35 outputs m number of selected signals. For example, suppose that the selection is made every other signal. Then, if signals $a_1$, $a_2$, $a_3$, $a_4$, $a_5$, $a_6$, . . . $a_n$ are input to the resampling filter 35, then signals $a_1$, $a_3$, $a_5$, . . . or signals $a_2$, $a_4$, $a_6$, . . . are output from the resampling filter 35. Furthermore, the resampling filter 35 also works as a low-pass filter for removing a quantization noise.

That is, sampling of analog signals is performed at the sampling frequency f by the AD converter circuit 11, and the resampling filter 35 selects every qth signal from the sampled signals. In other words, the sampling of analog signals is performed at a sampling frequency of f/q by the AD converter circuit 11 and the resampling filter 35.

Figure 5:
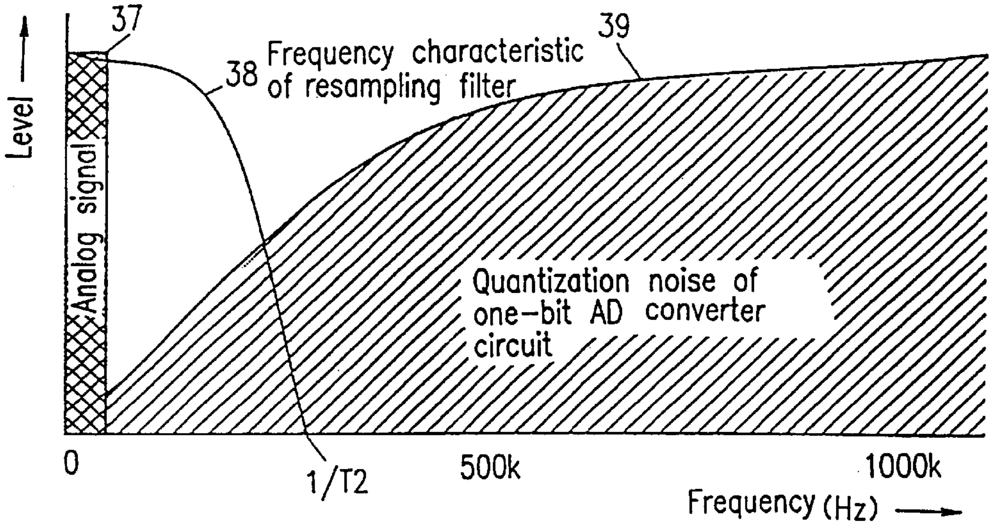
FIG. 5 is a diagram illustrating a frequency spectrum of a quantization noise produced by a noise shaping type one-bit analog/digital converter circuit and a frequency characteristic of a resampling filter.

FIG. 5 illustrates the frequency spectrum of a quantization noise produced by the noise shaping type one-bit analog/digital converter circuit and the frequency characteristic of the resampling filter. A level of the quantization noise 39 produced by the noise shaping type one-bit analog/digital converter circuit 33 is large in the high frequency region. However, the level of the quantization noise 39 is sufficiently small in the low frequency region where the frequency spectrum 37 of the input FM demodulation wave 32, which is an analog signal, is located. Therefore, if the resampling filter 35 has the frequency characteristic 38 (low-pass characteristic) as illustrated in FIG. 5, the above-mentioned quantization noise 39 in an output signal 36 can be sufficiently reduced. Specifically, the upper limit frequency of the pass-band of the resampling filter 35 having the frequency characteristic 38 is 1/T2 or less, and signals (noises) having frequencies higher than 1/T2 are sufficiently attenuated, where T2 represents the sampling period of the resampling filter 35.

Figure 6:
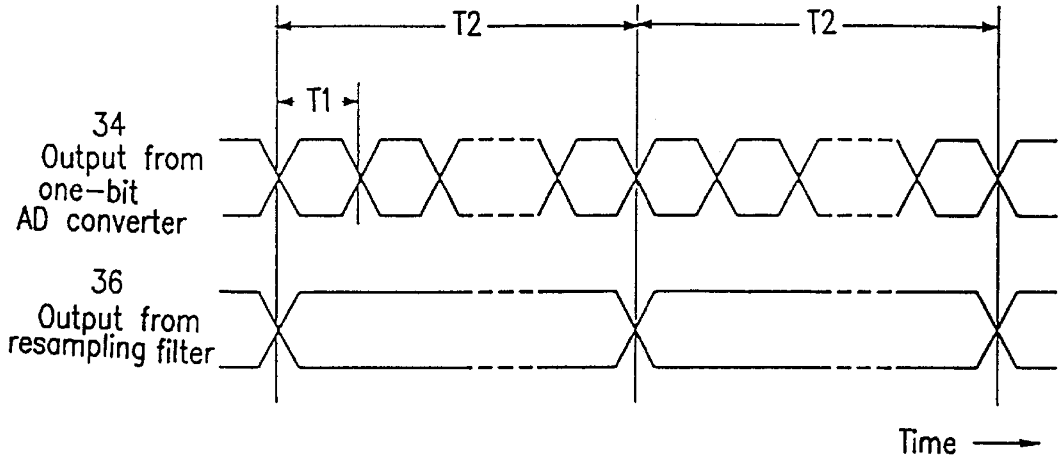
FIG. 6 is a timing chart showing an output 34 from the one-bit AD converter circuit 33 and an output 36 from the resampling filter 35 in FIG. 4.

FIG. 6 illustrates a timing for an output signal 34 from the one-bit AD converter circuit 33 and an output signal 36 from the resampling filter 35. In FIG. 6, T1 represents the sampling period of the one-bit AD converter circuit 33. If a ratio of the period T2 to the period T1 (T2/T1) is set to be large, for example, if the period T1 is set to be short while maintaining the period T2 constant, then high bit accuracy of the output 36 can be obtained. However, the frequency represented by 1/T1 cannot be set to be the upper limit of the sampling frequency or above of the one-bit analog/digital converter circuit 33. If the above-mentioned ratio T2/T1 is set to be small, that is, if the period T1 is set to be long while maintaining the period T2constant, then sufficient bit accuracy cannot be obtained. The term "bit accuracy" refers to a magnitude of a quantization noise in a signal obtained by sampling. Therefore, the higher the bit accuracy is, the smaller the quantization noise is.

If a second-order delta-sigma modulation is employed in the one bit analog/digital converter circuit 33, the bit accuracy becomes about eight bits (i.e., it has a resolution of eight bits) when the ratio (T2/T1) is 16, which is appropriate bit accuracy for a receiver for FM data multiplex broadcasting to be obtained. This can be derived experimentally or from calculation.

Figure 7:
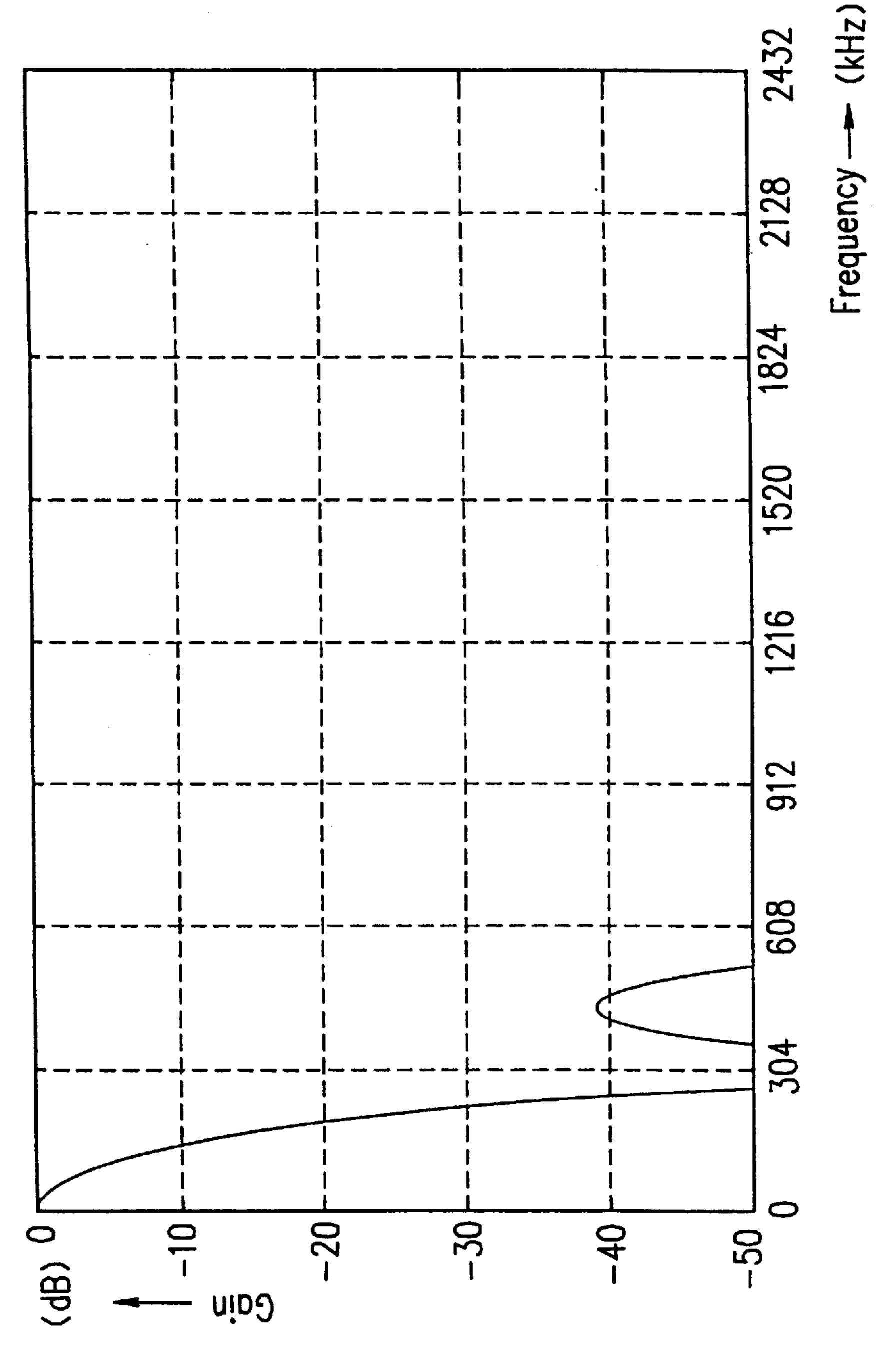
FIG. 7 is a graph illustrating examples of frequency characteristics of the one-bit AD converter circuit 33 and the resampling filter 35 when a ratio (T2/T1) is 16.

FIG. 7 illustrates an example of frequency characteristics of the one-bit AD converter circuit 33 and the resampling filter 35 when the ratio (T2/T1) is 16. These characteristics are generally called a moving average filter whose transmission function is given by equation 1 below.

$$H(z)=\{(1-z^{-16})/16(1-z^{-1})\}^3, \qquad \text{equation 1}$$

where z is a time delay operator.

Figure 8:
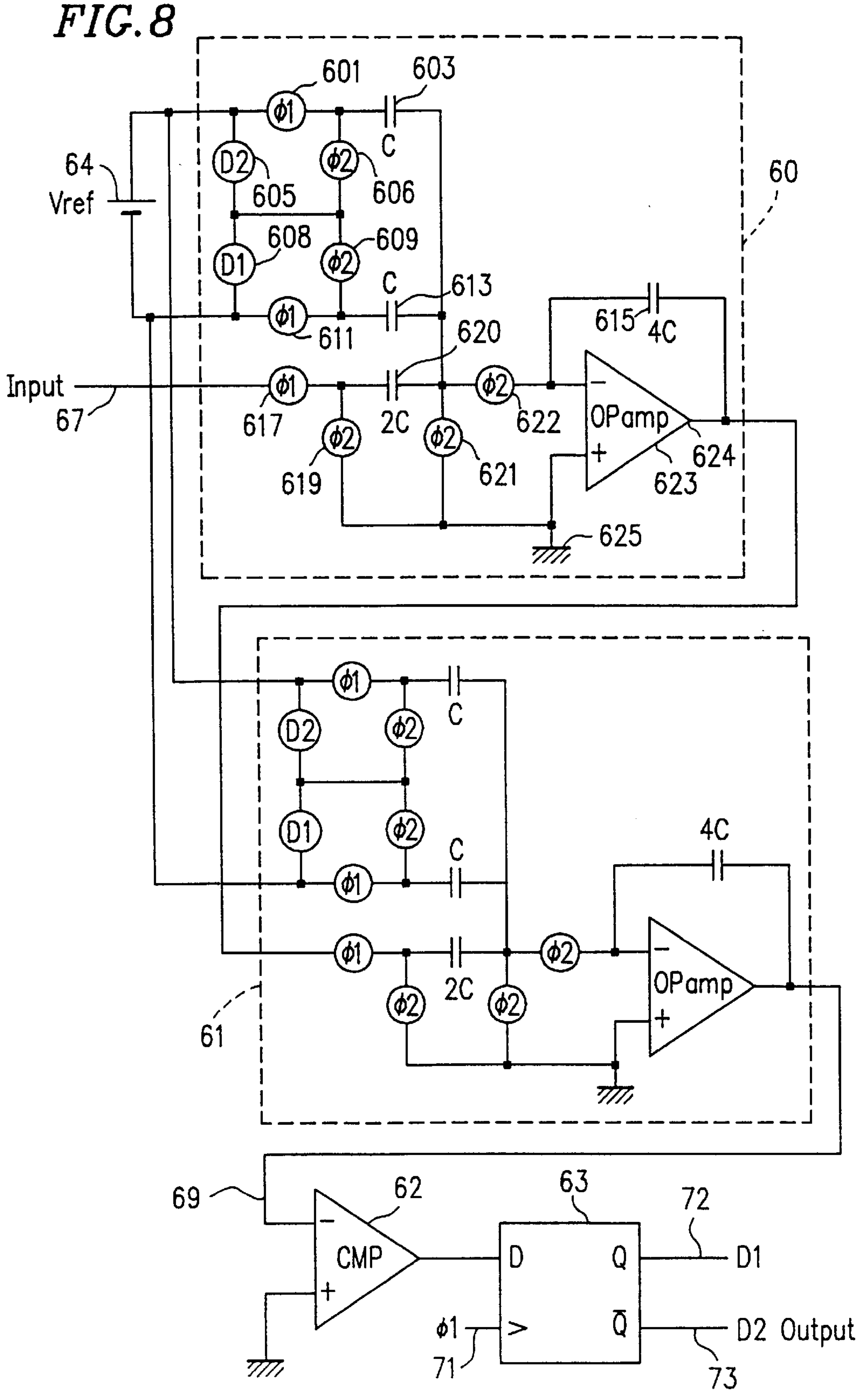
FIG. 8 is a circuit diagram illustrating an example of the above-mentioned noise shaping type one-bit AD converter circuit.

FIG. 8 illustrates an example of a block diagram for the above-mentioned noise shaping type one-bit AD converter circuit. This circuit is a one bit AD converter circuit according to a second-order sigma-delta modulation. The sigma-delta modulation is performed on an input signal 67 by a first stage integrator 60 and a second stage integrator 61 which are connected in series.

A comparator 62 quantizes the sigma-delta modulation signal 69 to either "0" or "1" with respect to the ground voltage. A D flip flop 63 produces a delay of one cycle period. A clock ϕ1 is given to a clock terminal 71 of the D flip flop 63.

Analog switches (MOS switches) in FIG. 8 operate as follows. In the integrator 60, a switch marked with D1, namely, the switch 608, is open when a signal from the Q output 72 of the D flip flop 63 is zero and is closed when the signal from the Q output 72 is 1. A switch marked with D2, namely, the switch 605, is open when a signal from the /Q (read as Q bar) output 73 of the D flip flop 63 is zero and is closed when the signal from the /Q output 73 is 1. Similarly, switches marked with ϕ1, namely, the switches 601, 611 and 617 are open when the clock ϕ1 is zero and are closed when the clock ϕ1 is 1. Switches marked with ϕ2, namely, the switches 606, 609, 619, 621 and 622 are open when the clock ϕ2 is zero and are closed when the clock ϕ2 is 1. Analog switches in the integrator 61 operate in the same way as described above. The phases of the signal from the Q output 72 (D1) and the signal from the /Q output 73 (D2) are in a relation of inverse phase. The signal from the Q output 72 and the signal from the /Q output 73 are fed back to the integrators 60 and 61 configured with switched capacitors. A voltage which is one half the voltage Vref of a reference power source 64 is applied to the integrators 60 and 61 based on the signal from the Q output 72 and the signal from the /Q output 73. The clocks ϕ1 and ϕ2 are given by a clock generator which is not shown in the figure. A duty ratio of the clocks ϕ1 and ϕ2 may conveniently be set such that open-close periods of the switches ϕ1 and ϕ2 do not overlap.

The configuration of the first stage integrator 60 will be described in greater detail. An input signal 67 is input to one end of an input capacitor 620 via the analog switch 617. The other end of the input capacitor 620 is connected to one end of feedback capacitors 603 and 613, respectively, and is also connected to the inverting input of an operational amplifier 623 via the analog switch 622. The non-inverting input of the operational amplifier 623 is connected to the ground 625.

The inverting input is connected to the output 624 of the operational amplifier 623 via an integration capacitor 615.

Figure 9:
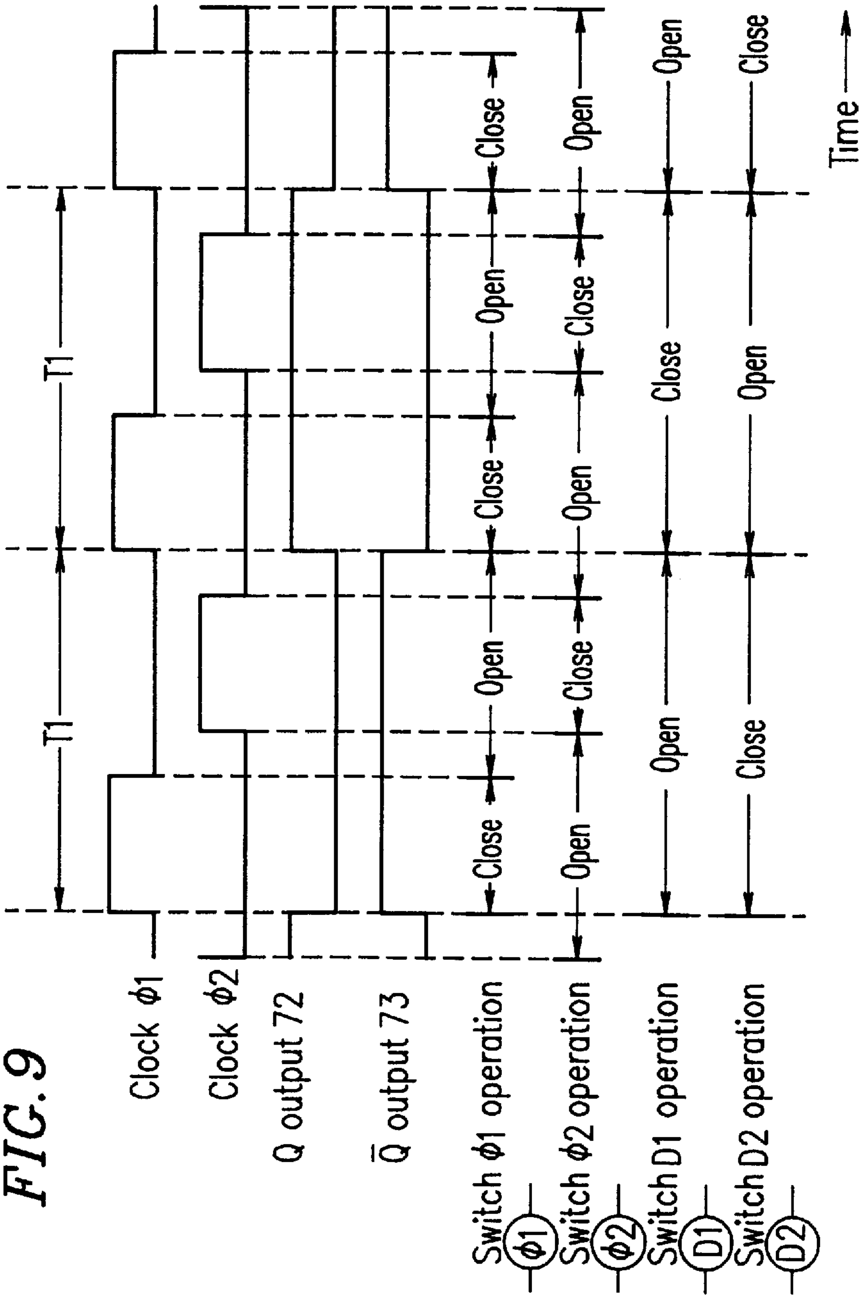
FIG. 9 is a chart illustrating conduction states of analog switches D1, D2, ϕ1 and ϕ2 when a Q output signal 72, /Q output signal 73, clock signal ϕ1 and clock signal ϕ2 change, respectively.

FIG. 9 illustrates conduction states of the analog switches D1, D2, $\phi$1 and $\phi$2 when the signal from the Q output 72, the signal from /Q output 73, clock $\phi$1 and clock $\phi$2 change, respectively.

The analog switch 608 closes when the signal from the Q output 72 (D1) is 1, and opens when the signal from the Q output 72 (D1) is 0. The analog switch 605 closes when the signal from the /Q output 73 (D2) is 1, and opens when the signal from the /Q output 73 (D2) is 0.

The analog switches 601, 611, and 617 and 622 close when the clock $\phi$1 is 1, and open when the clock $\phi$1 is 0. Similarly, the analog switches 606, 609, 619, 621 and 622 close when the clock $\phi$2 is 1, and open when the clock $\phi$2 is 0. The second stage integrator 61 has the same circuit as the first stage integrator 60.

The above-mentioned noise shaping type one-bit AD converter circuit 33 is capable of high speed operation compared to an eight-bit AD transformer, a 16-bit AD transformer, or the like. On the other hand, the noise shaping type one-bit AD converter circuit 33 has the frequency spectrum of the quantization noise biased to a high frequency region compared to the eight-bit AD transformer, the 16-bit AD transformer, or the like. Therefore, when combined with a resampling filter 35 to be described later, an AD transformer which is capable of high speed operation and has desirable resolution can be realized.

Figure 10:
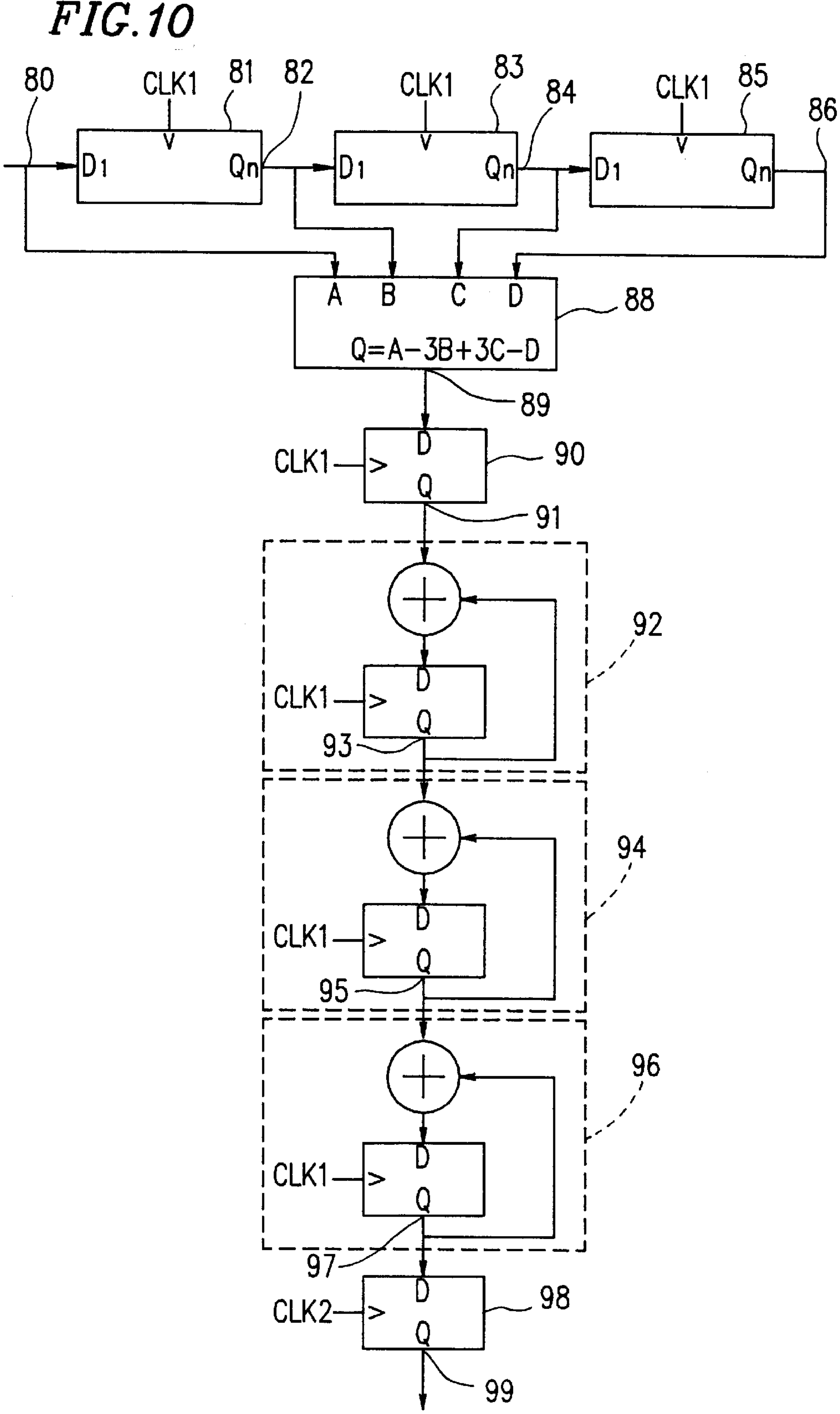
FIG. 10 is a diagram illustrating an example of a circuit of the resampling filter circuit 35.

FIG. 10 illustrates an example of the resampling filter circuit 35. The resampling filter circuit 35 will be described below with reference to FIG. 10.

The transmission characteristic of this circuit is given by equations 2, 3 and 4 below obtained by modifying equation 1 with the above-mentioned ratio (T2/T1) being (1/16).

$$H(z)=H1(z)\cdot H2(z), \quad \text{equation 2}$$

$$H1(z)=1-3z^{-16}=3z^{-32}-z^{-48}, \quad \text{equation 3}$$

$$H2(z)=(1-z^{-1})^{-3}. \quad \text{equation 4}$$

A digital input signal 80 is delayed by delays 81, 83 and 85 connected in series. The number of delay stages of the delays 81, 83 and 85 are assumed to be 16, respectively. The term "the number of delay stages" refers to the number of periods T1 for which a signal is delayed by the delay. An output signal 82 from the delay 81 is delayed by (16×T1) compared to the digital input signal 80. An output signal 84 from the delay 83 is delayed by (2×16×T1) compared to the digital input signal 80, and an output signal 86 from the delay 85 is delayed by (3×6×T1) compared to the digital input signal 80.

An operator 88 outputs operation results 89 based on the digital input signal 80, the 16-stage delayed output signal 82, the 32-stage delayed output signal 84 and the 48-stage delayed output signal 86. The operation to be performed by the operator 88 is given by equation 5 below derived from the above-mentioned equation 3.

$$Q=A-3B+3C-D. \quad \text{equation 5}$$

where A is a value of the digital input signal 80, B is a value of the 16-stage delay output signal 82, C is a value of the 32-stage delay output signal 84 and D is a value of the 48-stage delay output signal 86. The operation result 89 is held by a D flip flop 90.

The held signal 91 is integrated by integrators 92, 94 and 96 connected in series. The integrators 92, 94 and 96 are all configured with the same circuit. An operator designated by "+" in FIG. 10 represents a multi-bit addition. A process performed by these three stages of the integrators is described by the above-mentioned equation 4. The integrated signal 97 is held by a D flip flop 98.

Figure 11:
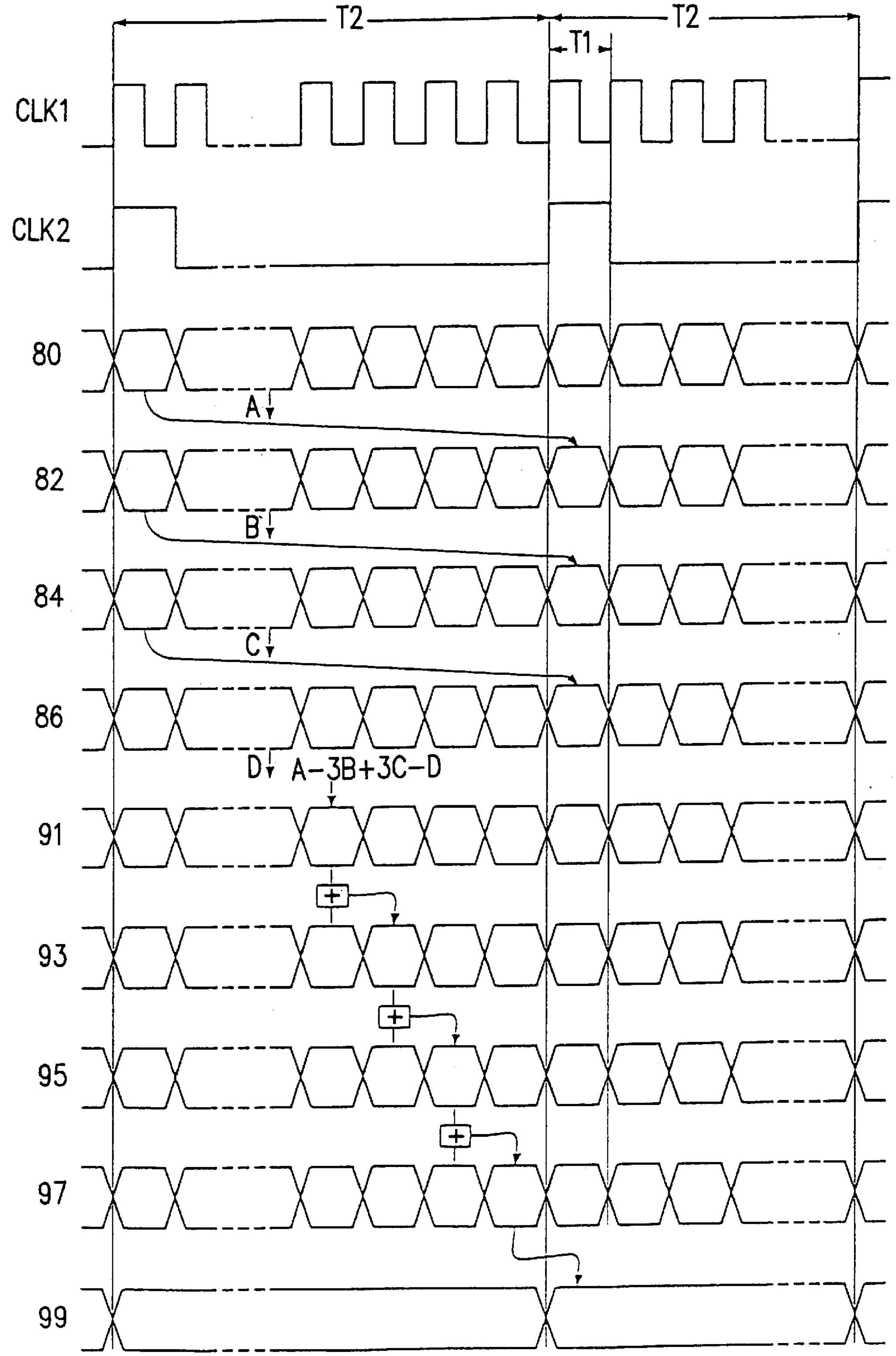
FIG. 11 is a chart illustrating a timing among clocks CLK1 and CLK2, and other signals in the circuit illustrated in FIG. 10.

FIG. 11 illustrates a timing chart for clocks CLK1 and CLK2, and the signals found in the circuit illustrated in FIG. 10. If the frequency of CLK1 (1/T1) is taken to be 4.864 MHz, then the frequency of CLK2 (1/T2) becomes 304 kHz.

Although the ratio (T2/T1) is (1/16) in the present example, the ratio may take a different value.

The above-mentioned resampling filter circuit 35 is realized with a digital circuit. Therefore, it is unlikely for the resampling filter circuit to receive outside noises, and it becomes possible to obtain a high signal-to-noise ratio.

Example 2

Figure 12:
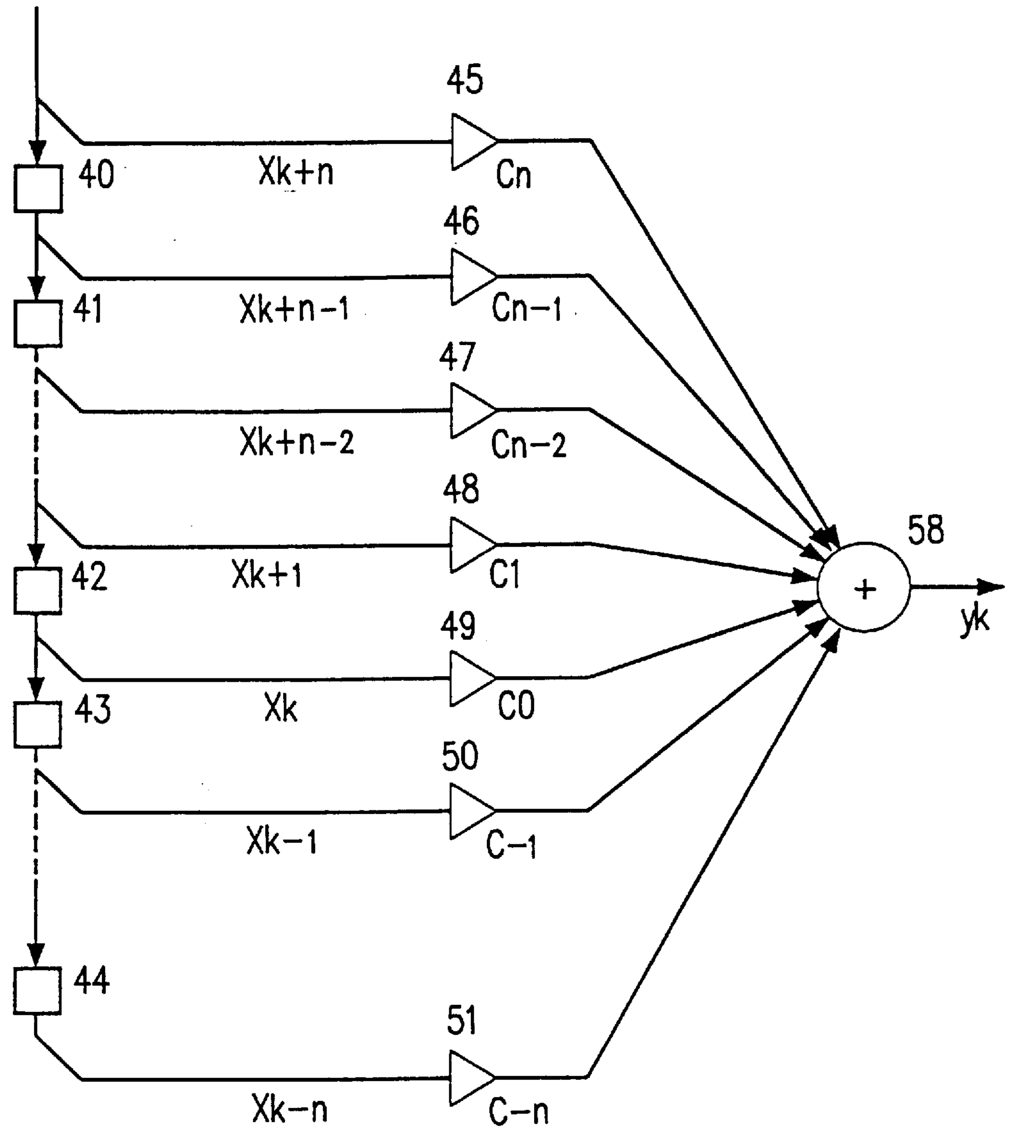
FIG. 12 is a diagram illustrating a configuration of an FIR (finite impulse response) filter used as a digital filter circuit 13 in the embodiment described in Example 2.

FIG. 12 illustrates a configuration of an FIR (finite impulse response) filter which is used as a digital filter circuit 13 in the embodiment described in Example 2. The FIR filter illustrated in FIG. 12 includes delay elements 40 to 44 having the same delay time T, filter multipliers 45 to 51 and an adder 58. Each of the delay elements 40 to 44 delays the signal input thereto by the time T and outputs the signal. Each of the multipliers 45 to 51 multiplies the signal input thereto by a predetermined filter coefficient and outputs the signal. The adder 58 sums up all the signals input thereto and outputs the results. In FIG. 12, a part of the circuit which repeats the same pattern is replaced with a broken line.

The FIR filter illustrated in FIG. 12 can realize a variety of characteristics by varying a value Cn of the filter coefficient of the multiplier. In this example, a band limiting filter having the filter coefficient value Cn given by equation 6 below is particularly used.

$$Cn=g(nT)\cdot\cos(2\pi fcnT) \quad \text{equation 6}$$

where n=0, ±1, ±2, ±3 . . .

In equation 6, g(t) is a window function which takes only positive values, and can be obtained by repeating calculations so that a desired band width is obtained. The center frequency of the band limiting filter is designated by fc. If the delay time T of the delay is set to be 1/(4fc), equation 7 below is obtained.

$$Cn=g(nT)\cdot\cos(0.5n\pi) \quad \text{equation 7}$$

where n=0, ±1, ±2, ±3 . . .

That is, $$Cn=g(nT) \text{ for } n=0, \pm4, \pm8 \ldots \quad \text{equation 8}$$

$$Cn=-g(nT) \text{ for } n=\pm2, \pm6, \pm10 \ldots \quad \text{equation 9}$$

$$Cn=0 \text{ for } n=\pm1, \pm3, \pm5 \ldots \quad \text{equation 10}$$

and the filter coefficient value Cn for n being an odd number, that is for n=±1, ±3, ±5. . . , can be made to be 0. In other words, filter coefficients of the multipliers at the positions adjacent to the center multiplier of the finite impulse response filter and then at every other position from the adjacent positions of the finite impulse response filter become zero. When the number of delay elements of the FIR filter is 4k−1 where k is a natural number, the multipliers whose filter coefficient becomes 0 are the multipliers receiving the signals which are not delayed and the multipliers receiving the signals which have passed 2r number of delay elements where r is an integer such that $1\leqq r\leqq k$.

When the number of delay elements of the FIR filter is 4k+1, the multipliers whose filter coefficient becomes 0 are the multipliers receiving the signals which have passed the 2r−1 number of delay elements.

As a result, in a case where the FIR filter is realized with hardware, simplification of the circuit becomes possible. In a case where the FIR filter is realized with software, reduction in the amount of calculation becomes possible. In either case, high speed filter processing becomes possible.

Figure 13:
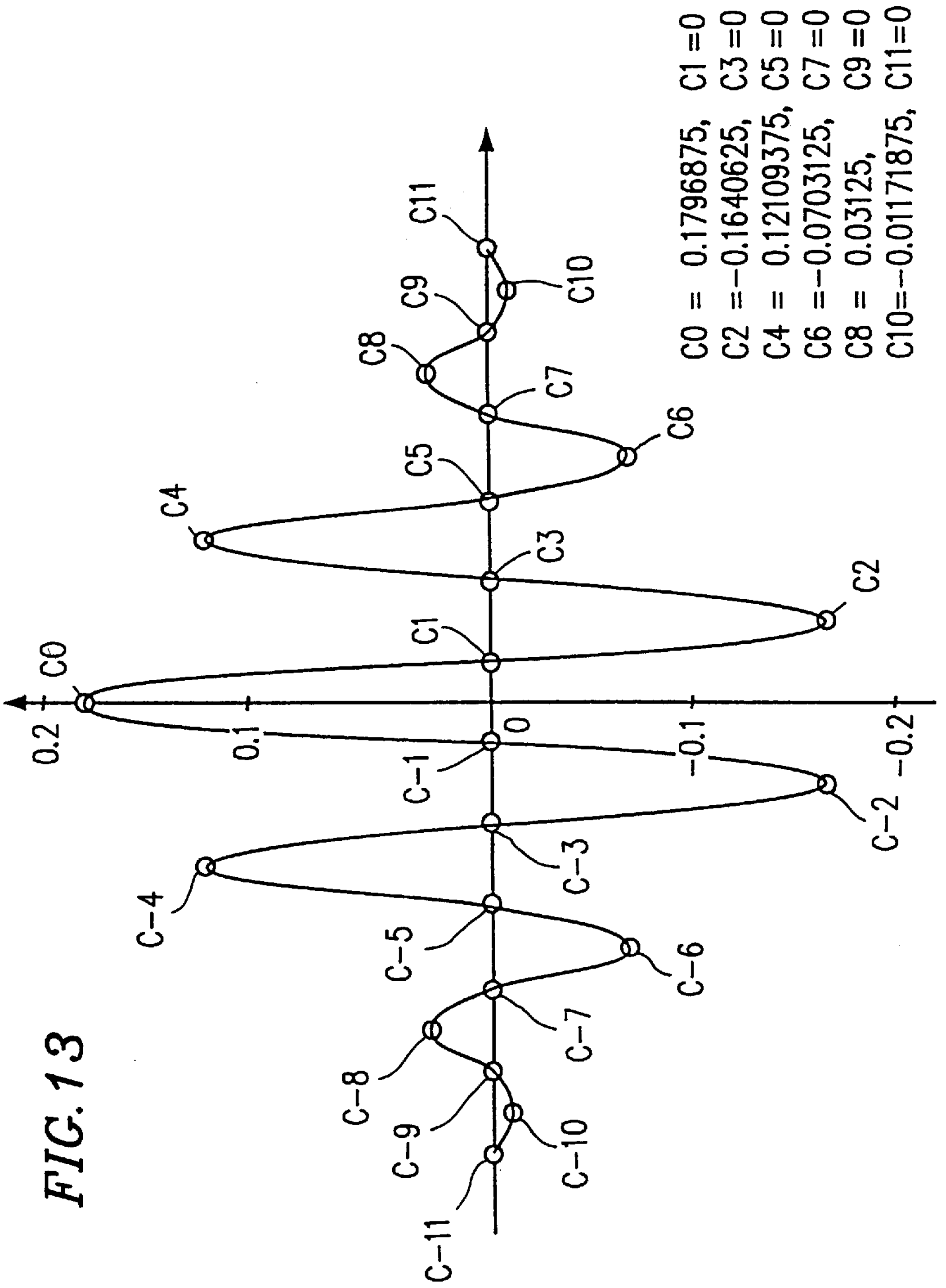
FIG. 13 illustrates an example of numerical values in a case where the number of multipliers of the FIR filter is 23.

FIG. 13 illustrates an example of numerical values in a case where the number of multipliers of the FIR filter is 23. In FIG. 13, the abscissa represents time and the ordinate represents amplitude. The filter coefficient values in FIG. 13 are symmetrically disposed with the coefficient CO being the center of the symmetry. That is, $$Cn=C-n \qquad \text{equation 11}$$

where n is a natural number, is satisfied.

Figure 14:
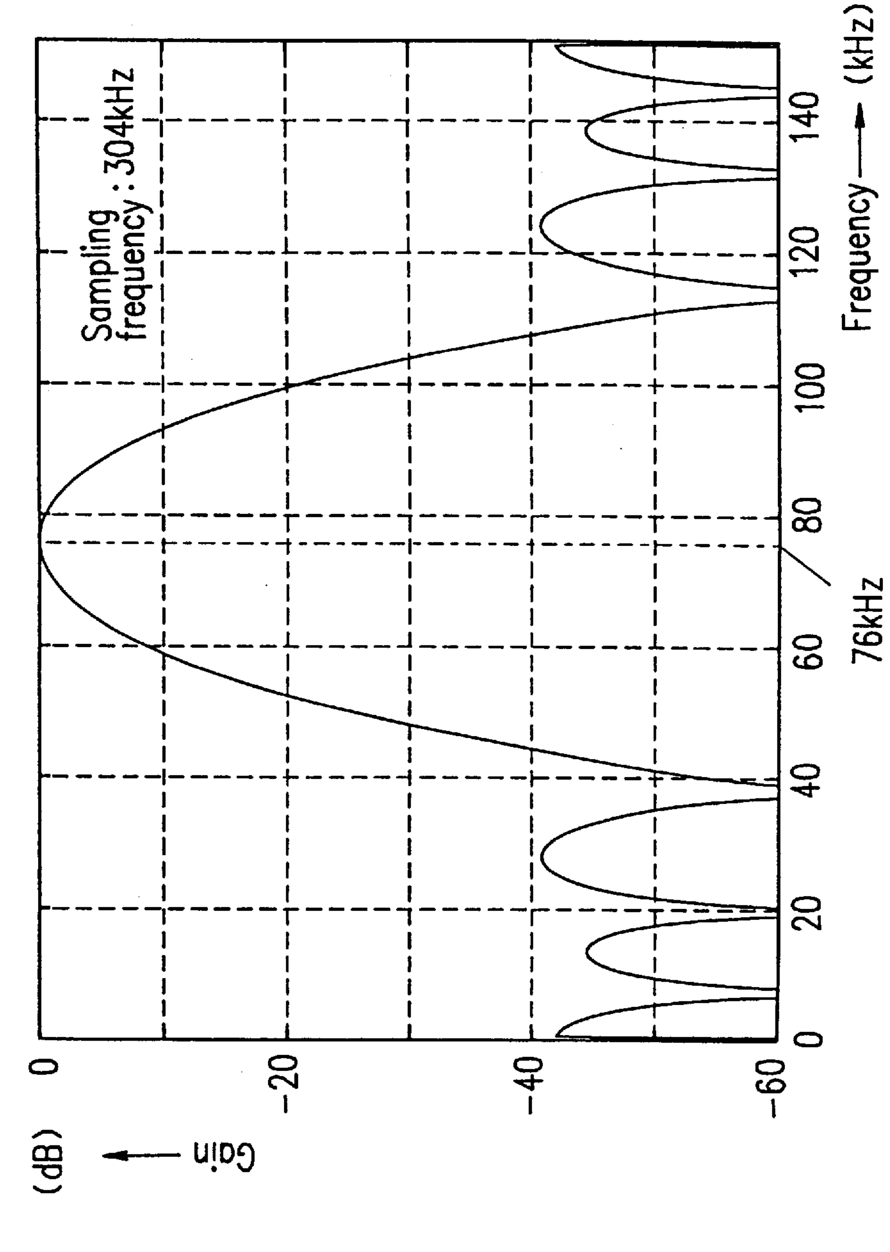
FIG. 14 is a graph illustrating a frequency characteristic of the digital filter circuit of FIG. 12.

FIG. 14 illustrates the frequency characteristic of the FIR filter when coefficients illustrated in FIG. 13 are used. In the figure, the multiplex signal center frequency is taken to be 76 kHz.

Figure 15:
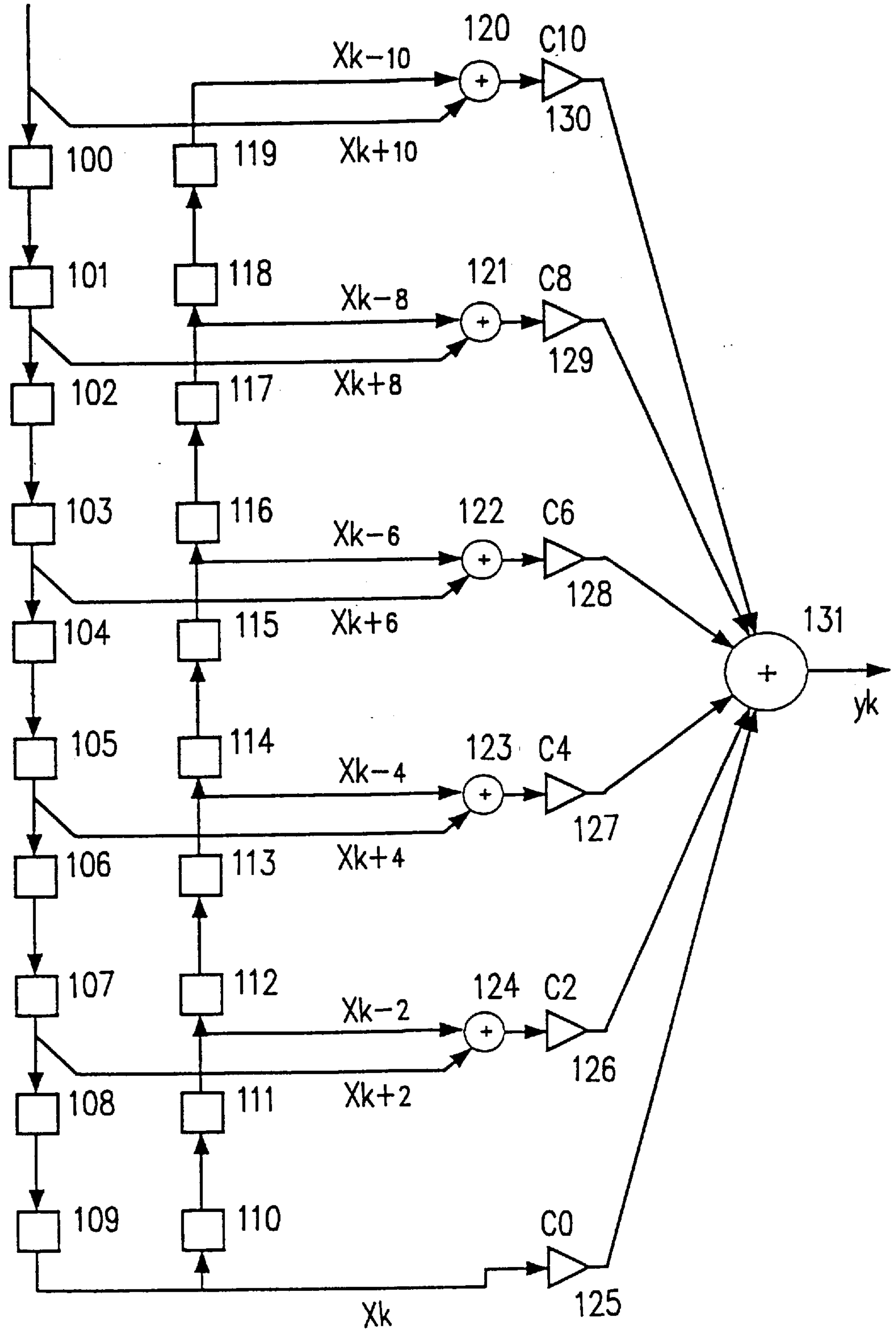
FIG. 15 is a diagram illustrating another example of the digital filter circuit in the embodiment described in Example 2.
Figure 16:
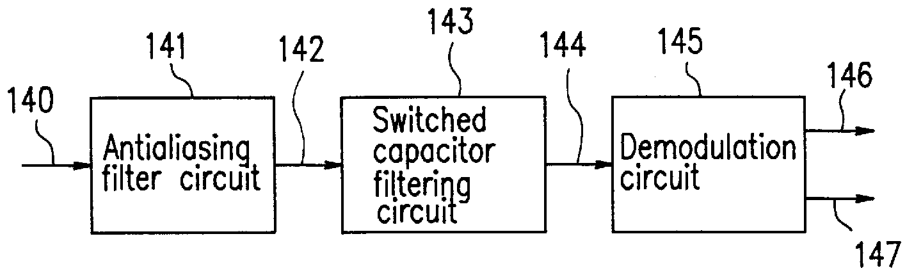
FIG. 16 is a block diagram illustrating a configuration of a conventional receiver for FM data multiplex broadcasting.
Figure 17:
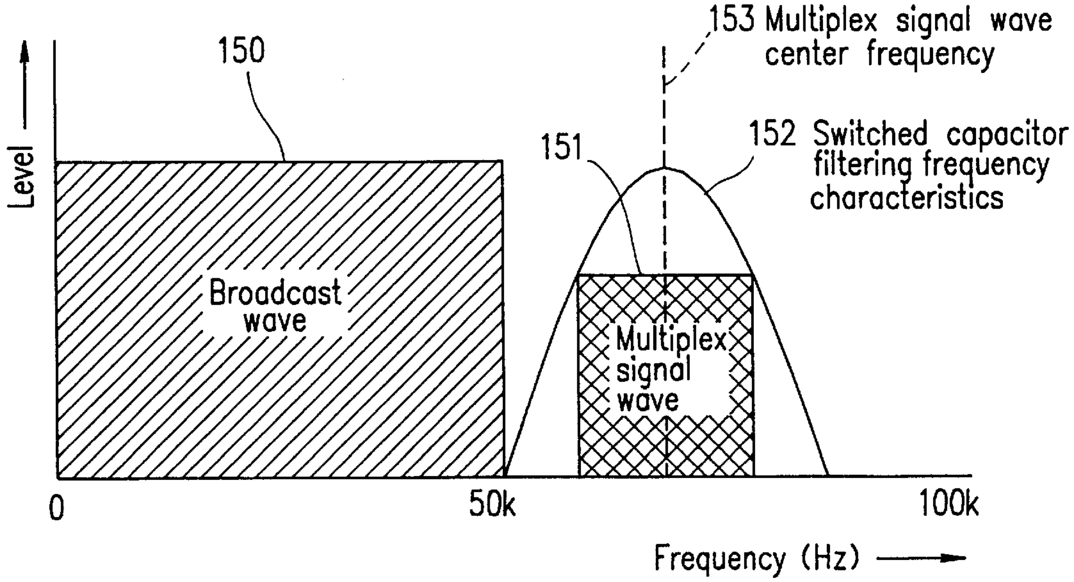
FIG. 17 is a diagram illustrating a frequency spectrum of an FM multiplex demodulation wave for describing FIG. 16.

FIG. 15 illustrates another example of a digital filter circuit in Example 2. Twenty delay elements 100 to 119 connected in series. The delay elements 101, 103, . . . 119 output signals Xk+10, Xk+8, . . . Xk−10. Using the fact that the coefficient of the signal Xk−α and the coefficient of the signal Xk+α are the same as illustrated in FIG. 13, Xk−α and Xk+α are added together by the adder and, then, multiplied by the coefficient Cα of the multiplier. Specifically, this operation is performed by adders 120 to 124 and multipliers 125 to 130. An adder 131 sums up outputs from the multipliers 125 to 130, and sends out an output yk. The FIR filter illustrated in FIG. 15 also uses coefficients illustrated in FIG. 13 and its frequency characteristic becomes similar to that illustrated in FIG. 14. An FIR filter having a different frequency characteristic may be used by changing the number of the multipliers or each coefficient value of multipliers.

The FIR filter can be realized with specially designed logic circuits and a multi-purpose DSP (digital signal processor). Moreover, the AD converter circuit described in Example 1, which has the one-bit AD converter circuit 33 and the resampling filter circuit 35, may be used as the AD converter circuit 11 of the present example.

As described above, a receiver for FM data multiplex broadcasting according to the present invention uses digital filters. On the other hand, a conventional receiver for FM data multiplex broadcasting only used analog filters. In a case where the center frequency of a multiplex signal wave is 76 kHz, it is necessary, for example, to perform digital processing with a sampling frequency of 304 kHz, which is quadruple the center frequency. However, there did not exist a conventional digital filter which operated at such a high sampling frequency, was of low noise and low power consumption design, and had a small scale circuit.

As described in Example 1, by using as an AD converter circuit the one-bit AD converter circuit and the resampling filter combined together, low noise can be realized. Since the one-bit AD converter circuit has a small scale analog circuit, power consumption can also be reduced. Moreover, as described in Example 2, by using as a digital filter circuit the FIR filter whose mth filter coefficient value is zero, where m is an odd number, and whose sampling frequency is quadruple the frequency of the desired wave, both high speed operational processing and miniaturization of the circuit become possible. The fact that the digital filter can be used in the receiver for FM data multiplex broadcasting by combining the AD converter circuit and the digital filter circuit was first recognized by the inventor of the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A receiver for FM data multiplex broadcasting comprising:

an analog/digital converter for receiving an analog FM demodulation signal and for converting the analog FM demodulation signal into a digital FM demodulation signal;

a digital filter for processing the digital FM demodulation signal so as to isolate a digital multiplex signal; and a demodulator for demodulating said digital multiplex signal, said analog/digital converter comprising a noise shaping type one-bit analog/digital converter for receiving the analog FM demodulation signal and for converting the analog FM demodulation signal into digital signals based on a sampling frequency, and a resampling filter for selecting the digital FM demodulation signal from the digital signals based on one nth of the sampling frequency.

2. The receiver for FM data multiplex broadcasting according to claim 1, wherein said noise shaping type one-bit analog/digital converter performs second-order sigma-delta modulation.

3. The receiver for FM data multiplex broadcasting according to claim 1, wherein n is 16.

4. The receiver for FM data multiplex broadcasting according to claim 1, wherein said digital filter comprises a finite impulse response filter.

5. The receiver for FM data multiplex broadcasting according to claim 4, wherein said finite impulse response filter comprises a plurality of delay elements, a plurality of multipliers and an adder.

6. The receiver for FM data multiplex broadcasting according to claim 5, wherein the number of said plurality of delay elements is 4k−1 where k is a natural number, and said plurality of multipliers whose filter coefficient become 0 are multipliers receiving signals which are not delayed and multipliers receiving signals which have passed 2r number of said plurality of delay elements, where r is a natural number.

7. The receiver for FM data multiplex broadcasting according to claim 5, wherein the number of said plurality of delay elements is 4k+1 where k is a natural number, and said plurality of multipliers whose filter coefficient become 0 are multipliers receiving signals which have passed 2r−1 number of said plurality of delay elements where r is a natural number.

8. The receiver for FM data multiplex broadcasting according to claim 5, wherein filter coefficient values of said finite impulse response filter are symmetrical.

9. The receiver for FM data multiplex broadcasting according to claim 5, wherein filter coefficients of said plurality of multipliers at positions adjacent to a center multiplier and then at every other position from the positions adjacent the center multiplier of said finite impulse response filter are 0.

10. The receiver for FM data multiplex broadcasting according to claim 5, wherein said finite impulse response filter performs signal processing at a sampling frequency which is quadruple a multiplex signal center frequency.

11. The receiver for FM data multiplex broadcasting according to claim 2, wherein n is an integer.

12. A method of receiving FM data multiplex signals comprising:

a) receiving an analog FM demodulation signal;

b) converting the received analog FM demodulation signal into a digital FM demodulation signal;

c) digitally processing the digital FM demodulation signal so as to isolate a digital multiplex signal; and d) demodulating the digital multiplex signal, said step b) comprising b1) converting the received analog FM demodulation signal into digital signals using a noise shaping type one-bit analog/digital converter based on a sampling frequency, and b2) selecting the digital FM demodulation signal from the digital signals using a resampling filter based on one nth of the sampling frequency.

13. The method of receiving FM data multiplex signals of claim 12, wherein the noise shaping type one-bit analog/digital converter performs second-order sigma-delta modulation.

14. The method of receiving FM data multiplex signals of claim 12, wherein n is 16.

15. The method of receiving FM data multiplex signals of claim 12, wherein said step c) comprises digitally processing the digital FM demodulation signal with a finite impulse response filter.

16. The method of receiving FM data multiplex signals of claim 15, wherein the finite impulse response filter comprises a plurality of delay elements, a plurality of multipliers and an adder.

17. The method of receiving FM data multiplex signals of claim 16, wherein the number of the plurality of delay elements in the finite impulse response filer is 4k−1, where k is a natural number, and the plurality of multipliers whose filter coefficient become 0 are multipliers receiving signals which are not delayed and multipliers receiving signals which have passed 2r number of the plurality of delay elements, where r is a natural number.

18. The method of receiving FM data multiplex signals of claim 16, wherein the number of the plurality of delay elements is 4k+1, where k is a natural number, and the plurality of multipliers whose filter coefficient become 0 are multipliers receiving signals which have passed 2r−1 number of delay elements, where r is a natural number.

19. The method of receiving FM data multiplex signals of claim 16, wherein filter coefficient values of the finite impulse response filter are symmetrical.

20. The method of receiving FM data multiplex signals of claim 15, wherein the finite impulse response filter performs signal processing at a sampling frequency which is quadruple a multiplex signal center frequency.

21. The method of receiving FM data multiplex signals of claim 16, wherein filter coefficients of the plurality of multipliers at positions adjacent to a center multiplier and then at every other position from the positions adjacent the center multiplier of the finite impulse response filter are 0.

22. The method of receiving FM data multiplex signals of claim 12, wherein n is an integer.

* * * * *